United States Patent
Dostal

(10) Patent No.: US 8,157,556 B2
(45) Date of Patent: Apr. 17, 2012

(54) PULLER SPEED CONTROL DEVICE FOR MONITORING THE DIMENSIONS OF AN EXTRUDED SYNTHETIC WOOD COMPOSITION

(75) Inventor: David F. Dostal, Cambridge, WI (US)

(73) Assignee: Strandex Corporation, Madison, WI (US)

( * ) Notice: Subject to any disclaimer, the term of this patent is extended or adjusted under 35 U.S.C. 154(b) by 1130 days.

(21) Appl. No.: 11/871,473

(22) Filed: Oct. 12, 2007

(65) Prior Publication Data
US 2008/0088049 A1 Apr. 17, 2008

Related U.S. Application Data

(60) Provisional application No. 60/852,363, filed on Oct. 16, 2006.

(51) Int. Cl.
*B29C 47/92* (2006.01)

(52) U.S. Cl. ..... 425/140; 425/141; 425/325; 425/326.1; 425/377; 425/461

(58) Field of Classification Search .......... 425/71, 425/140, 141, 325, 326.1, 377, 461
See application file for complete search history.

(56) References Cited

U.S. PATENT DOCUMENTS

| | | |
|---|---|---|
| 3,671,726 A | 6/1972 | Kerr |
| 4,137,025 A | 1/1979 | Graves et al. |
| 4,152,380 A | 5/1979 | Graves et al. |
| 4,188,544 A | 2/1980 | Chasson |
| 4,209,476 A | 6/1980 | Harris |
| 4,286,880 A | 9/1981 | Young |
| 4,517,145 A | 5/1985 | Knopf |
| 4,525,315 A | 6/1985 | Greten |
| 4,765,941 A | 8/1988 | Anthony, Jr. et al. |
| 4,879,752 A | 11/1989 | Aune et al. |
| 4,882,104 A | 11/1989 | Dobrowsky |
| 4,926,350 A | 5/1990 | Bechtel et al. |
| 5,056,922 A | 10/1991 | Cielo et al. |
| 5,122,315 A | 6/1992 | Darley |
| 5,162,873 A | 11/1992 | Burk |
| 5,516,472 A | 5/1996 | Laver |
| 6,138,052 A | 10/2000 | Kristensen et al. |
| 7,206,076 B2 | 4/2007 | Blalock |
| 7,869,900 B2 * | 1/2011 | McCauley et al. ............ 700/196 |

(Continued)

FOREIGN PATENT DOCUMENTS
JP 10249919 9/1998

*Primary Examiner* — Yogendra Gupta
*Assistant Examiner* — Joseph Leyson
(74) *Attorney, Agent, or Firm* — Charles S. Sara, Esq.; DeWitt Ross & Stevens, S.C.

(57) ABSTRACT

A system for controlling the dimensions of an extrudate exiting an extruder and for compensating for the variations in the extrusion rate of the extruder, expansion rate and rate of travel of the extrudate through sizing devices by changing the speed of an extrudate puller device, includes an extruder which extrudes the extrudate; a conveyor system comprising rollers and a series of sizing devices; a puller device for pulling the extrudate through the sizing devices; and a laser proximity measuring device to assist the system in keeping the desired shape of the extrudate. The laser proximity measuring device includes at least one pair of optical non-contact displacement transducers, a real time processor, and an interactive touch screen display unit. The transducers emit a laser beam which provides a laser point on the side of the extrudate.

5 Claims, 3 Drawing Sheets

U.S. PATENT DOCUMENTS

| | | |
|---|---|---|
| 2002/0024677 A1 | 2/2002 | Metcalfe et al. |
| 2003/0011789 A1 | 1/2003 | Shirley |
| 2004/0032040 A1 | 2/2004 | Harris |
| 2004/0246473 A1 | 12/2004 | Hermary et al. |
| 2005/0080507 A1 | 4/2005 | Silberg et al. |
| 2006/0033935 A1 | 2/2006 | Keightley et al. |

* cited by examiner

PULLER SPEED CONTROL DEVICE FOR MONITORING THE DIMENSIONS OF AN EXTRUDED SYNTHETIC WOOD COMPOSITION

REFERENCE TO RELATED APPLICATION

The application claims priority to U.S. Provisional Application entitled "Puller Speed Control Device and Method for Monitoring Shape and Size of Extruded Wood Materials," Ser. No. 60/852,363, filed Oct. 16, 2006, which is incorporated herein by reference in its entirety.

FIELD OF THE INVENTION

The present invention relates generally to the technology of forming boards from an extruded synthetic cellulose/plastic wood composition for use as lumber. The present invention is specifically directed to a device designed to control the dimensional variation of an extruded synthetic cellulose/plastic wood composition with low melt strength. The present invention is further directed to a device designed to control the dimensional variation of extruded synthetic cellulose/plastic wood compositions with low melt strength having inherent properties which make consistent volume output from an extrusion device impossible.

BACKGROUND OF THE INVENTION

U.S. Pat. No. 5,516,472 to Laver ("Laver") is incorporated herein by reference and teaches the use of an extruder in the extrusion of an extruded synthetic wood material, comprised predominantly of cellulosic fibers in a thermoplastic matrix. The synthetic wood material described in Laver is representative of the class of building materials now generally known as wood plastic or cellulosic composites and hereafter referred to as "cellulosic composites," or "extruded cellulosic composites" or simply "extrudate." The cellulosic composite is a true composite as opposed to a filled thermoplastic material in that the cellulosic composite possesses properties of the cellulosic fibers, such as stiffness and compressive strength while also possessing properties of the thermoplastic material such as resistance to water, fungal decay, and termite infestation.

Extrusion of this composite results in the production of a material in which the molten thermoplastic is intimately associated with the cellulosic fibers. Although the thermoplastic forms a continuous matrix surrounding the cellulosic filler, the volume ratio of thermoplastic and cellulosic filler is such that the ability of the molten plastic to flow is very limited. As a result the composite will maintain its shape even while the thermoplastic is still in a molten state.

Thermoplastic polymer extrusion, on the other hand, results in the production of a molten, viscous fluid. This fluid may be shaped by passing it through a die in a manner similar to that shown in Laver. However the polymer will not maintain that shape unless it is cooled below its molten state. In fact, it is the nature of the polymer extrudate to swell as it exits the shaping die due to the relaxation of forces imposed on the polymer during the shaping process. Therefore, the desired shape must be maintained until the extrudate has cooled. This is accomplished by drawing the molten polymer through a sizing and cooling die or a series of such dies with a puller device.

A puller device, which is well known by those familiar with polymer extrusion, is a machine that produces traction by means of moving belts, and pulls the extrudate through the sizing devices by grasping the end of the extrudate and mechanically pulling it from the extruder through the sizing devices under pre-designed conditions of time and speed in order to keep the extrudate consistent in shape and size. Reference is made to Laver which describes the use of a puller device in an extrusion process.

Swelling of the extrudate as it exits the shaping die results in a surplus of material between the shaping die and the first sizing/cooling die. The extrudate is drawn down to the desired size and shape. Small variations in volume output from the shaping die can be corrected through this process since some variation in the amount of fluid material is not harmful to the process. Larger variations in output or accumulations of surplus material require some corrective measures. Either volume output from the shaping die or the rate at which material is moved through the sizing/cooling dies by the puller device must be adjusted.

Devices exist that perform these functions in the production of plastic pipe, plastic profiles, and other products made from polymer extrudates. For example, U.S. Pat. No. 4,209,476 to Harris describes one device. This device is designed to maintain the average value of some dimension of a formed and cooled profile close to the desired average value for that dimension. This device works by measuring the volume flow rate of extrudate from the die, quantifying one easily measured dimension of the formed and cooled profile, measuring the length of profile produced in a given time interval, and using a microprocessor to calculate the average value of the desired dimension during the given time interval from the measured volume and length with an adjustment made for swell or shrink as determined from the easily measured dimension. The volume of material passing through the extrusion die in the given time interval must be known in this method. The device presented in Harris measures the volume produced by counting revolutions of a metering or melt pump.

U.S. Pat. No. 4,137,025 to Graves et al describes another control system designed for use in thermoplastic pipe production. This control system measures the wall thickness of a plastic pipe in the early stages of cooling and adjusts puller speed to correct deviations from the desired thickness. The measurement device used in this control system is an ultrasonic measuring device which must be coupled to the surface of the pipe either through direct contact or through a suitable liquid agent. The ultrasonic device rotates around the circumference of the plastic pipe so that measurements of the wall thickness can be taken from multiple locations and averaged. An operator console is provided for the control system however the function is limited to a choice of manual or automatic control. No provision is made for adjustment of the automatic control system while it is functioning.

Another device developed for use in processing plastic profiles is the BETALASER MIKE control device as described in U.S. Pat. No. 6,138,052 to Kristensen. This device uses a laser micrometer to measure a small profile or a small feature of a larger profile. The laser micrometer used by this device has an aperture measuring approximately 4 mm by 15 mm. By placing a small profile within the aperture changes in profile size can be measured. This gives a measurement that can be compared to upper and lower tolerance limits. The principle of the BETALASER MIKE control device is to keep the profile size within tolerance by changing the speed of the puller or haul off device. The BETALASER MIKE control device is claimed to be an improvement over prior devices in the use of an amplified digital signal as opposed to the analog signals used previously. Unlike the devices of Harris and Graves, the BETALASER MIKE control device is represented as a control device for use in the production of foamed polymer profiles in addition to tubing and small unfoamed profiles. In the foam profile application, the profile is generally too large to fit within the aperture of the laser micrometer measuring device. The laser micrometer is mounted on the face of the shaping die so that a small portion or corner of the extrudate lies within the aperture. Changes in the amount of die swell present at the die exit cause the amount of material within the aperture to change. Theoretically, this can be related to volume output of the extruder. Changes in the haul off rate can be made based on the predicted volume output. Obviously this system requires uniform output throughout the cross section of the profile as otherwise changes in the small portion actually measured will not be representative of the profile.

All three of these devices rely on the presence of die swell and on the high melt strength of a polymer extrudate. However, the extrudate described by Laver is not capable of being shaped or sized by these conventional means after it exits the extruder. The cellulosic composite does not swell upon exiting from the shaping die so there is no surplus of material to offset variations in volume output. The cellulosic composite has very low melt strength and is easily torn apart while still in the molten state. As previously noted, the variation in volume output of the cellulosic composite is much greater than that of the polymer extrudate because of the variable properties of the cellulosic fibers. In commercial practice, this cellulosic composite is produced without any downstream sizing and without the use of a puller or haul off device.

While the cellulosic composite can be produced without downstream sizing because of the absence of die swell, it would be advantageous to size the cellulosic composite in some applications. Downstream sizing would improve dimensional tolerance in critical applications and would allow for the introduction of smaller detail in the parts produced. New products might be produced by the application of coatings or of reinforcing fibers downstream from the extruder, something not feasible in a single step process at this time because of the added frictional drag encountered during application.

What is needed is a control device capable of detecting changes in extruder volume output as soon as they begin to occur and responding rapidly to those changes. It would be a further advantage if the control device had some capability of predicting the extent and duration of changes in volume output since this would increase the precision of control.

The rate at which the extrudate is extruded, the rate of expansion of extrudate, and the rate the extrudate moves through the sizing devices must be balanced so that the correct amount of material enters the sizing devices at all times. If the rate of travel of the extrudate through the sizing devices is slower than the rate of extrusion and expansion, then excess material will build up between the extruder and the sizing devices, causing the profile of the extrudate to become deformed. If the rate of travel of the extrudate through the sizing devices is faster than the rate of extrusion and expansion, then the material will not fill the sizing devices also leaving a deformed extrudate. The profile of the extrudate will not have the desired shape or surface characteristics and, in some cases, may be pulled apart due to the lack of material.

The rate at which the extrudate is extruded may vary because of variations in the rate at which material is fed into the extruder or by variations in the feedstock. The rate of expansion may vary due to changes in processing temperatures or due to variability in the amount of gas-producing materials in the feedstock. As noted, the presence of cellulosic fibers increases the variation in both output and expansion. Puller speed can be considered to be constant, but the elasticity of the extrudate can cause variations in rate of travel through the sizing devices as the extrudate will stretch when more force is required to pull the material through the sizing devices and contract when less force is required. The effects of these variations in rate are more dramatic as the production rate increases. Frequent operator intervention is required to keep the system balanced.

It would be advantageous if a device was capable of measuring volume output when expansion was partially completed, could respond rapidly and frequently to measured changes, and further to have some predictive capability regarding the extent and duration of those changes.

SUMMARY OF THE INVENTION

The purpose of the present invention is to compensate for variations in the volume output of a low melt strength extruded cellulosic composite by changing the puller speed in response to the variations. If the volume output rate increases the puller speed is increased. If the volume output rate decreases the puller speed is decreased. The puller speed control device is designed to keep continuity in a low melt strength cellulosic composite enabling that cellulosic composite to be sized or detailed downstream from the extruder. The extruded cellulosic composite may be further coated or reinforced downstream in a one step process.

Referring to the reference numbers in the figures, the present invention is directed to a puller speed control device for controlling the dimensions of a low melt strength cellulosic composite extrudate 16 exiting an extruder 14 and for compensating for the variations in the volume output rate of the extruder 14 by changing the speed of an extrudate puller device 30, comprising a non-contact measuring device 50 comprising at least one pair of optical non-contact displacement transducers 52, 54; a real time processor 40 capable of responding to the variations inherent to the cellulosic composite extrudate 16; and an interactive touch screen display unit 60 synchronized with the real time processor 40, wherein the interactive touch screen display unit 60 includes means to adjust the speed of the extrudate puller device 30 based on the output of the real time processor 40. The optical non-contact displacement transducers 52, 54 each preferably comprise a laser illustrated by dotted lines 53, 55 projecting therefrom to either side of the extrudate 16 as it is extruded from the extruder 14, wherein the lasers 53, 55 reflect off the sides of the extrudate 16 at a laser point 56, 57 back to a receiving element, wherein the angle of reflection calculates the distance between the receiving element and the side of the extrudate 16. Alternatively, the non-contact measuring device 50 is comprised of a digital camera 72 connected to a digital imaging device 74 capable of frame capture.

The present invention is further directed to a system 10 for controlling the dimensions of extrudate 16 exiting an extruder 14 and for compensating for the variations in the volume output rate of the extruder 14 by changing the speed of an extrudate puller device 30; comprising an extruder 14 which extrudes the extrudate 16; a conveyor system 20 comprising rollers 22 and a series of sizing devices 24; a puller device 30 for pulling the extrudate 16 through the sizing devices 24; and a puller speed control device to assist the system 10 in keeping the desired shape of the extrudate 16, wherein the puller speed control device comprises a non-contact measuring device 50 to detect changes in size of the extrudate 16, wherein the non-contact measuring device 50 consists of one or more pairs of non-contact displacement transducers 52, 54, a real time processor 40, and a touch screen display unit 60, wherein the touch screen display unit 60 includes a programmable microprocessor capable of communication with other processors via Ethernet, serial port, or USB; a real time processor 40 dedicated to the task of determining the magnitude of any change in size, the duration of any change in size and the trend of any change in size so that predictive corrections may be applied to puller speed, and an interactive touch screen display unit 60. Alternatively, the non-contact measuring device is comprised of a digital camera 72 connected to a digital imaging device 74 capable of frame capture.

The present invention is further directed to a process for forming an extrudate from an extruded synthetic cellulose/plastic wood composition for use as lumber comprising extruding the extrudate from an extruder comprising an extrusion stranding die and a shaping die; attaching the extrudate to a puller device for mechanically pulling the extrudate from the extruder at a measured speed, wherein the speed of the extrudate being pulled from the extruder is maintained by a command signal generated by a puller drive unit wherein the puller drive unit comprises a non-contact measuring device; inputting a set point into the command signal wherein the set point calibrates to the desired dimensions of the extrudate; pulling the extrudate from the extruder by means of the puller device; and adjusting the speed of the puller device to coordinate with the set point.

Manual control of extruder screw speed or speed of the puller device requires constant operator intervention. The present invention relieves the operator of the responsibility for rate adjustment, allowing the operator to focus attention on other maintenance demands while operating more lines.

Cellulosic composite extrudates do not behave in the same manner as polymer extrudates. The melt viscosity of cellulosic composites is much higher than that of polymer extrudates. In the case of a foamed product, this means that the expansion of the profile happens much more slowly than the expansion of polymer foams. A device such as the BETALASER MIKE cannot effectively anticipate sizing die fill by measuring expansion at the die face.

The use of pairs of non-contact displacement transducers is an advantage since they allow measurement of the degree of calibrator fill at the calibrator entrance. In addition, the transducer spacing may be changed to adjust for any size profile.

Another advantage is the use of a dedicated real time processor for the task of determining the magnitude, duration, and trend of measured changes in size. This enables corrections of a predictive nature to be made to puller speed in the following way. Puller speed will be changed in an amount that is directly proportional to the measured change in size. An increment of change will be added for the time interval for which the measured change exists. An adjustment to the amount of change will be made based on whether the amount of measured change is increasing or decreasing.

Another advantage of the present invention is the use of a dedicated real time processor 40 for process control with a synchronized microprocessor for operator interaction. This allows the operator to adjust the control variables without interrupting process control. Since the real time processor 40 is never interrupted, it is capable of more precise control of puller speed in response to the variable flow of a composite extrudate. Precise control is necessary for the processing of the composite extrudate 16 described by Laver due to the low melt strength of that material. No stretching can be tolerated in the production of this composite extrudate 16. As noted above, this composite extrudate 16 possesses all of the factors that cause variable volume output in the production of the composite extrudate of Laver with the factors of variable expansion and variable rate of travel through the sizing devices due to elasticity added.

The present invention enables the use of traction in the production of cellulosic composite. This allows for finer detailing and/or closer tolerance of those extrudates. The use of traction also expands processing options by allowing the inclusion of coating and/or reinforcing stations that increase resistance to material flow in the extrusion line.

DETAILED DESCRIPTION OF THE INVENTION

Figure 1:
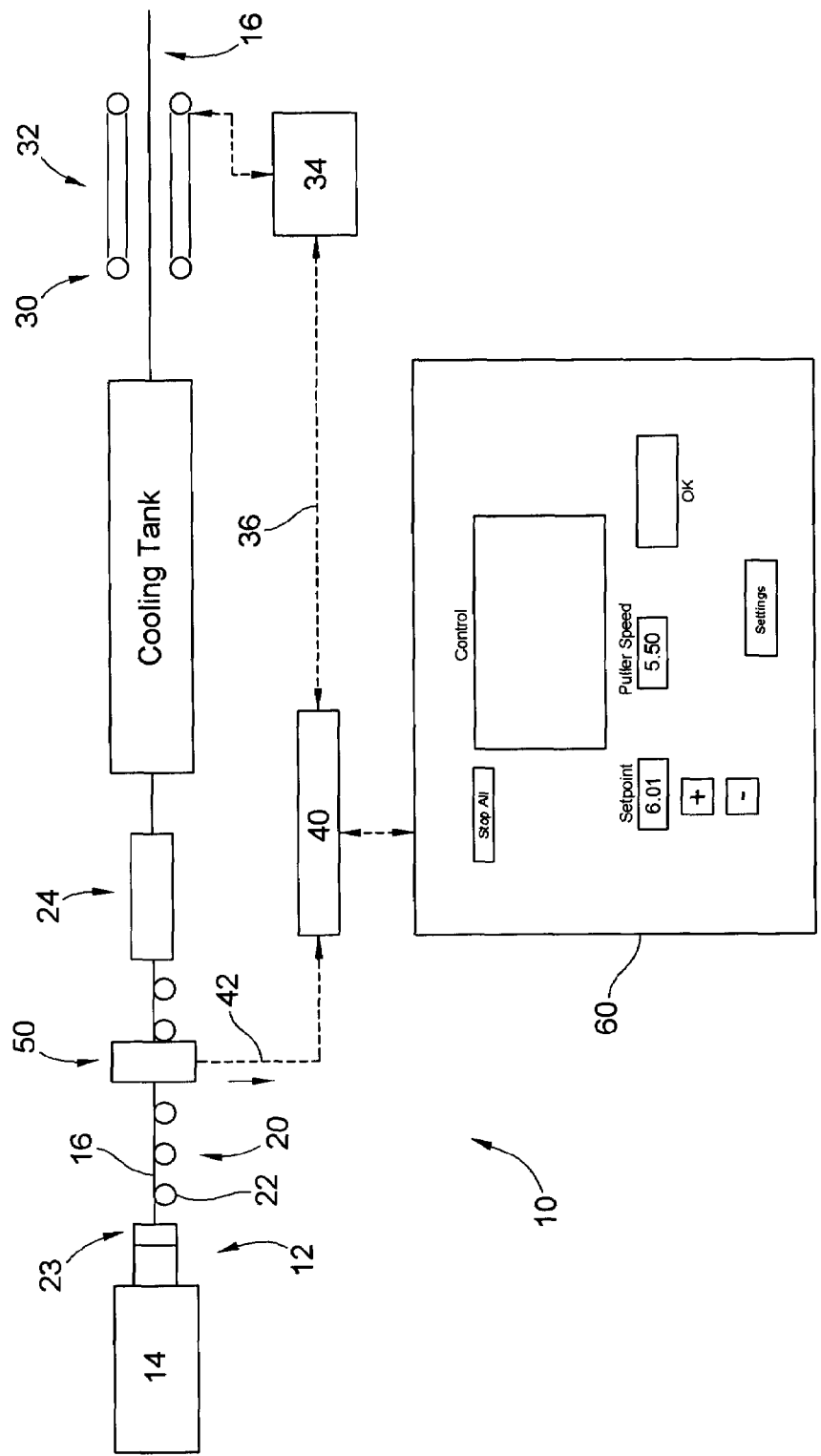
FIG. 1 is a flow chart of the process of the present invention directed to sizing and cooling a low melt strength extrudate.

The present invention is directed to a system for controlling the dimensions of a cellulosic composite exiting an extruder and for compensating for the variations in the volume output rate of the extruder by changing the speed of an extrudate puller device. The invention is specifically directed to a puller speed control device.

Cellulosic Composite

The extruded cellulosic composite of the present invention is comprised predominantly of cellulosic fibers in a thermoplastic matrix as described in Laver. An example of the cellulosic composite is STRANDEX material (Strandex Corporation, Madison, Wis.).

The cellulosic composite is a true composite as opposed to a filled thermoplastic material in that the cellulosic composite possesses properties of the cellulosic fibers such as stiffness and compressive strength while also possessing properties of the thermoplastic material such as resistance to water, fungal decay, and termite infestation.

Being of natural origin, the cellulosic fibers in the cellulosic composites are inherently variable in size, shape, and chemical structure. The fibers possess varying amounts of cellulose, hemicellulose, and lignin. Each of these components influences the extrusion process in a different manner in and of themselves as well as by the differential affinity that they each have for water.

While every effort is made to ensure a uniform mixture or feedstock of material in commercial composite extrusion manufacturing by segregating plant species, processing plant material in a manner designed to produce a uniform particle size distribution, and drying the feedstock prior to extrusion, the composite feedstock still possesses inherent variation due to the natural fiber component. This variation affects the processing of the material by altering properties such as internal lubrication, external lubrication, and extrudate viscosity all of which affect material flow rate.

In addition to the inherent variability introduced by the cellulosic fiber, there is a distinct change in the melt strength, i.e., the ability of a thermoplastic polymer melt stream to stretch without tearing apart. While thermoplastic polymer extrudates can be stretched by a factor of many times, for example in the manufacture of thin plastic films, the cellulosic composites will stretch only a very small amount before tearing.

The cellulosic fibrous-polymer composite material of the present invention is characterized by having a higher cellulosic fiber content than normally recognized in the prior art. While the prior art normally requires a material content including approximately 50% fiber to 50% thermoplastic material, the material of the present invention preferably has a higher fiber content. The material can have up to a near 1:0 fiber/thermoplastic content by employing the continuous low temperature extrusion process of the present invention and the proper mix of starting materials. The basic process requires mixing of basic types of raw materials including cellulosic fibers and thermoplastic materials. Cross-linking agents and process lubricants may also be included in the basic mixture.

One advantage of the present invention is that it can incorporate virtually any kind of waste cellulosic material from sawdust to pond sludge and newspapers. As described earlier, any cellulosic material may be used as a raw material including old newspapers, alfalfa, wheat pulp, wood chips, wood particles, wood flour, wood flakes, wood fibers, ground wood, wood veneers, wood laminates, kenaf, paper, cardboard, straw, and other cellulosic fibrous materials. The cellulosic fibrous material may also comprise refined cellulose such as cotton or viscous and plant fibers such as kenaf, bamboo or palm fiber, straw or any other cellulosic fibrous material. Prior to being combined with the other starting materials, the cellulosic materials should be dried to a moisture content between approximately 1% and 9%. A preferred moisture content is no more than 2%. Drying technologies are known to the art. A suitable example is a desiccant dryer manufactured by Premier Pneumatics, Inc. (Allentown, Pa.).

The thermoplastic materials serve primarily as a process fluidizer. Most types of thermoplastic materials may be used, examples of which include multi-layer films, virgin thermoplastics such as polyethylene, polypropylene, poly-vinyl chloride (PVC), low density polyethylene (LDPE), copolyethylene-vinyl acetate and waste plastic sawdust from other industries as well as other recyclable polymer materials. Although thermoplastic materials are a preferable component in the make-up of the starting materials, it is not required. As long as the starting material includes a sufficient amount of cross-linking agents and lubricants to "plasticize" the mixture in the extruder, the starting materials do not necessarily require the use of thermoplastic materials.

The ratio of cellulosic fibers to the thermoplastic material is, therefore, between approximately 4:1 and 1:0. Preferably the ratio between the cellulosic fibers to the thermoplastic material is approximately 1:1.

The cross-linking agent serves to strengthen the bond between the several strands of the cellulosic fibers into a final homogenous product. The cross-linking agents bond across the pendent hydroxy groups on the cellulose molecular chain. Cross-linking agents must have the characteristics of forming a strong bond at relatively low temperatures. Examples of cross-linking agents include polyurethanes such as isocyanate, phenolic resins, unsaturated polyesters and epoxy resins and combinations of the same. The phenolic resins may be any single stage or two stage resin preferably with a low hexane content. Although the starting material may comprise a cross-linking agent to strengthen the bonds between the cellulosic fiber strands, the cross-linking agent is not required to form the final product contemplated by the inventive process as long as thermoplastic and cellulosic materials are included in the starting material.

Lubricants, which are common commercial lubricants known to the art of plastic processing, behave as a process aid. Examples of typical lubricants include zinc stearate, which is an internal lubricant and paraffin-type wax, which is an exterior lubricant.

Other materials, which can be added, are known to the art of extrusion and include accelerators, inhibitors, enhancers, compatibilizers and blowing agents. Accelerators, inhibitors, enhancers and compatibilizers are agents which control the speed at which the cross-linking agents work. Accelerators are added to increase the speed of the cross-linking reaction. Examples of accelerators include amine catalysts such as Dabco® BDO (Air Products, Allentown, Pa.) and DEH40® (Dow Chemical). Inhibitors are added to retard the speed of the cross-linking reaction. Examples of known inhibitors include organic acids such as citric acid. Enhancers are used to increase the reactivity between components. Examples of enhancers include cobalt derivatives. Compatibilizers are used to form a more effective bond between cellulosic materials and thermoplastics. Examples of compatibilizers include ethylene-maleic anhydride copolymers. Blowing agents are added to decrease density. An example of a blowing agent is CELOGEN® TSH (Uniroyal Chemical).

There are many formulation recipes which can be prepared for the starting mixture. The following table includes four examples (expressed in pounds of material):

| RECIPE | I | II | III | IV |
|---|---|---|---|---|
| Wood Flour | 25.00 | 25.00 | 25.00 | 25.00 |
| Polyethylene | 15.00 | 12.50 | 15.00 | 7.50 |
| Zinc Stearate | .75 | 1.50 | 1.00 | 1.25 |
| Wax | .50 | .50 | .50 | .75 |
| Phenolic Resin | 1.50 | .00 | .00 | 8.50 |
| Isocyanate | .50 | 1.00 | .00 | .00 |
| Epoxy Resin | .00 | .00 | 2.50 | .00 |
| Catalyst | .00 | .00 | .075 | .00 |

The preferred formulation is as follows:

| MATERIAL | AMOUNT (PARTS) |
|---|---|
| Wood Flour (40 Mesh) | 100.0 |
| Polyethylene (HDPE) | 40.0 |
| Zinc Stearate | 3.0 |
| External Wax | 2.0 |
| Phenolic Resin | 6.0 |
| Blowing Agent | 1.5 |

The wood flour is dried to 2% moisture content or less. The polyethylene (HDPE) and polyurethane are mixed in a ribbon blender until absorbed, approximately five minutes. The remaining ingredients are added to the mixture, and blended for approximately three minutes or until evenly mixed under conditions known to the art.

Extruder

Figure 2:
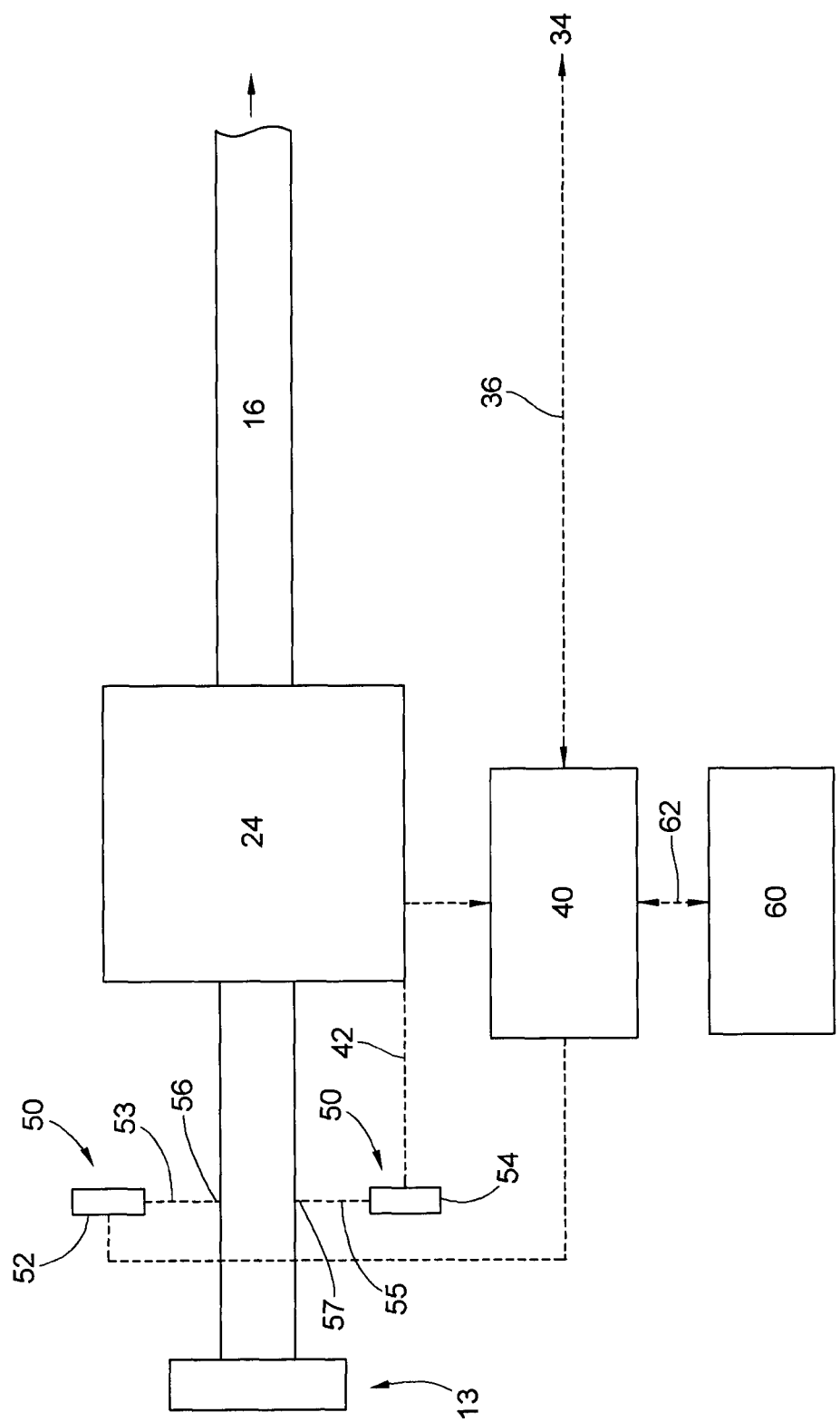
FIG. 2 is a plan view of the process showing the first embodiment of the non-contact measuring device.

Referring to FIGS. 1 and 2, the system 10 of the present invention includes an extrusion stranding die 12 and a shaping die 13 attached to an extruder 14 which extrudes the cellulosic composite extrudate 16 as described above. Any extrusion stranding die 12 found to be useful in the extrusion of cellulosic composite materials may be used. The stranding die system as described by Laver may be used in the preferred embodiment. The extrudate 16, which leaves the stranding die 12, is very hot and in a molten, but formed, shape. For illustration purposes, the shape may be rectangular, similar to that of a standard 1 inch by 6 inch board of indeterminate length. As the extrudate 16 leaves the stranding die 12, it enters the conveyor system 20 comprising rollers 22 and is carried to a sizing and cooling die 24 comprising a series of sizing devices (not shown). The purpose of the sizing devices is to cool the extrudate 16 and to assist in keeping its desired shape.

Puller Device

A puller device 30 generally includes a series of belts 32 which pull the extrudate 16 through the sizing and cooling die 24 by grasping the end of the extrudate 16 and mechanically pulling it from the extruder 14 through the sizing and cooling die 24 by means of moving belts 32 under pre-designed conditions of time and speed in order to keep the extrudate 16 consistent in shape and size. The speed at which the belts 32 move is maintained by the puller drive unit 34 in response to a command signal represented by dotted line 36 which may be generated by the puller drive unit 34 itself or come from a real time processor 40. While not being restricted to any particular parameters, the device of the present invention can be designed to operate at puller speeds at rates above 700 pounds per hour.

Non-Contact Measuring Device

To assist the system 10 in keeping the desired shape of the extrudate 16, a non-contact measuring device 50 is placed in the conveyor system 20. The measuring device 50 preferably includes one or more pairs of optical non-contact displacement transducers 52, 54, illustrated in FIG. 2, analog and digital I/O devices, and the real time processor 40, illustrated in FIGS. 1 and 2.

In the preferred embodiment the non-contact measuring device 50 consists of one or more pairs of non-contact displacement transducers 52, 54. An example of such a transducer is the optoNCDT 1401 model ILD 1401-100 Compact Charge Coupled Device (CCD) laser displacement sensor manufactured by Micro-Epsilon (Raleigh, N.C.). Similar transducers from other manufacturers are readily available. When energized by the digital I/O device, each non-contact displacement transducer 52, 54 measures the distance between the transducer 52, 54 and the surface of the extrudate 16. This measurement is transformed to an electrical signal which is transmitted to the analog I/O device where it is converted to a digital signal and passed to the real time processor 40, as illustrated by dotted line 42.

The pair of non-contact displacement transducers 52, 54 allows the system 10 to be used on any size or shape of extrudate 16 by changing the mounting locations of the transducers 52, 54 and compensating for this change in location in the software. The transducers 52, 54 emit a light beam, preferably a laser beam, illustrated by dotted lines 53, 55, which provides laser points 56, 57, illustrated in FIG. 2, on the side of the extrudate 16.

Real Time Processor

While computer control brings a great deal of speed to process control, computer processors typically have multiple tasks such as checking clock cycles or waiting for key strokes or other interaction. These tasks can interfere with the process control if the computer assigns them a higher priority.

The processor 40 of the present invention is capable of responding to the variations inherent to the extrudate 16 because of the use of a real time processor 40 which does not multitask. This processor 40 will complete a control cycle at precise intervals. The steps involved in this control cycle are established by a set of instructions that is executed by the real time processor when it is powered up.

The real time processor 40 is dedicated to one repetitive task. There are no background tasks which could interfere with the timing of this task. The task is comprised of the following steps:

1. the real time processor 40 polls the processor of the touch screen display unit 60 for a command string which is always available;
2. the real time processor 40 extracts values from the command string that determine whether it should be in an active or passive mode, the desired relative dimensional measurements, the response that should be made when an error exists, and the operator selected puller speed;
3. the real time processor 40 polls each non-contact displacement transducer 50 for the current measurement;
4. the real time processor 40 polls the puller drive unit 34 command signal;
5. the real time processor 40 combines displacement measurements obtained from each transducer 50 of a pair to obtain a relative dimensional measurement;
6. if the real time processor 40 determines it is in passive mode it sends the operator selected puller speed to the puller drive unit 34 and skips to step 9;
7. the real time processor 40 compares the actual relative dimensional measurements and the desired relative dimensional measurements with any difference considered to be an error;
8. the real time processor 40 applies the operator specified response variables to the error, applies the result to the puller drive unit 34 command signal, and sends the puller drive command signal to the puller drive unit 34;
9. the real time processor 40 returns the command string to the processor of the touch screen display unit 60 after updating the puller speed and relative dimension values; and
10. the real time processor 40 waits until the start time for the next cycle arrives and then returns to step 1.

Touch Screen Display Unit

The touch screen display unit 60 contains a programmable microprocessor that is capable of communication with other processors via Ethernet, serial port, or USB. The use of a second processor integral to the touch screen display unit 60 allows operator interaction to occur without interfering with the timing of the measurement and control cycles of the real time processor. Commands are passed between the real time processor 40 and this second processor as part of each control cycle. This also allows the response of the extrudate puller device 30 to be tuned by the operator without interrupting the process control. This speed and flexibility are required in a control device which functions in our process.

The touch screen display unit 60 is controlled by the second processor and communicates with the real time processor 40 via serial communication port, USB, or Ethernet connection 62. This frees the real time processor 40 from the overhead of interacting with the operator so that the real time processor 40 can be dedicated to control the puller 30. Using this arrangement allows adjustments to be made at the rate of 5 per second.

As is typical with any computer processor, the touch screen display unit 60 loads an operating system and a startup program when it is powered on. In the preferred embodiment, when the startup program is executed the default values of desired relative dimensional measurements and response variables are loaded into the program and inserted into the command string. The touch screen display unit 60 is synchronized with the real time processor 40. The default values are then passed to the real time processor 40 when the display unit is polled.

The operator can interact with the touch screen display unit 60 without disrupting the operation of the real time processor 40 or disturbing the synchronization of the two processors. Virtually any value contained in the command string can be read, displayed, modified, and returned to the real time processor 40. The operator may choose active or passive mode, modify puller speed (in passive mode), modify response variables, or modify the desired relative dimensional measurements. A command to change a value remains until it has been read. It will be executed when it is read and updated values are ready to transmit at the next polling. This assures that the cycles of the real time processor will not be disrupted.

Other features may be readily added to the display unit program. Some values may be password protected so that only authorized operators can change them. Alarms may be added so that operators do not change form active to passive state unknowingly. Values may be displayed in graphical format. Any display attribute developed for or adapted to this platform could be added.

Software

The set of instructions executed by the real time processor together with the startup program executed by the processor contained within the touch screen display unit 60 constitute the software described below.

The software is designed so that the real time processor 40 can be assigned to one of three tasks by passing the appropriate command from the processor of the touch screen display unit 60. Each real time processor 40 task corresponds to a specific screen displayed on the touch screen display unit 60. When the puller speed control is energized, both the real time processor 40 and the processor of the touch screen display unit 60 are booted and communication is established between the two processors. At that point, the screen shown on the touch screen display unit 60 is the "Settings" screen. The purpose of this screen is to allow the operator to review and change the proportional (P), integral (I), or derivative (D) gains or to change the factor used to convert the command voltage sent to the puller into puller speed measured in feet per minute. Any changes are passed to the real time processor 40. The real time processor 40 turns the power supplied to the non-contact transducers off when it is in the "Settings" state. The command voltage sent to the puller device 30 is maintained at the level it was at when the real time processor 40 entered the "Settings" state.

From the "Settings" screen, the operator may advance the puller speed control to the "Monitor" screen. The puller command voltage and the set point controlling profile size can be adjusted on this screen. In the "Monitor" state, the real time processor 40 energizes the non-contact transducers and displays traces of the relative width and the set point on a real time graph. Unless it is adjusted by the operator, the puller command voltage is maintained at the level it was at when the real time processor 40 entered the "Monitor" state.

From the "Monitor" screen, the operator may advance to the "Control" screen. Adjustments to the set point controlling profile size are the only adjustments allowed on this screen. In the "Control" state, the real time processor 40 maintains power to the non-contact transducers and assumes control of the puller speed by adjusting the puller command voltage in response to changes in the relative width. The operator may advance to the "Settings" screen from the "Control" screen.

Operation

In operation, a set point is inputted into the computer system that runs the laser. As an example and referring to FIG. 1, the set point can be set to 6.01, which equates to 6.01 inches in width of the extrudate 16. Referring to FIGS. 1 and 2, as the laser points 56, 57 detract from the side of the extrudate 16, the width of the extrudate 16 is then calibrated, which consistently changes the puller speed. For example, the puller speed will consistently change between approximately 4.75 feet per minute to 5.05 feet per minute. These settings can be changed depending on different conditions.

Each laser point 56, 57 measures the distance to the surface of the extrudate 16 it is facing. Combining the two measurements gives a relative width of the profile. This relative width is compared to a set point that may be adjusted by the operator.

The puller speed is adjusted by a 0-10V output controlled by a built in proportional, integral, derivative (PID) function that compares relative width with the set point. When the width falls below set point, the puller speed control device 30 slows down. When the width is larger than set point, the puller speed control device 30 speeds up.

Alternative Embodiment

Figure 3:
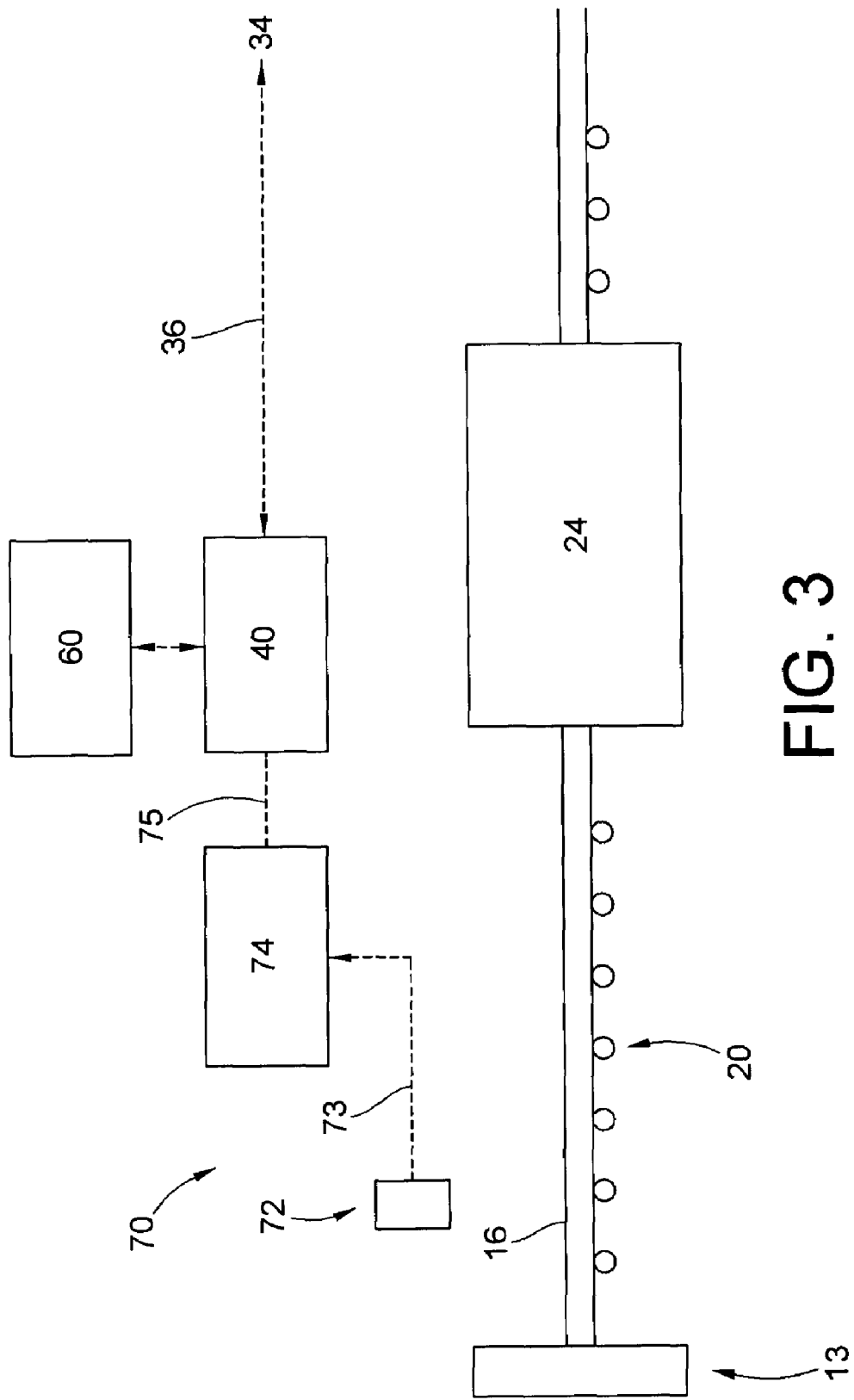
FIG. 3 is a side view of the process showing the second embodiment of the non-contact measuring device.

Reference is now made to FIG. 3 for an alternative embodiment of this invention. Referring to FIG. 3, the non-contact measuring device 70 is comprised of a digital camera 72 connected to a digital imaging device 74 capable of frame capture. Digital cameras are well known. An example of a digital imaging device is the National Instruments NI CVS-1454 Compact Vision System (National Instruments, Austin, Tex.). The digital camera 72 records an image as a string of data related to the location and color of small blocks (pixels) of the image. The digital imaging device 74 receives this string of data via line 73 and processes the data looking for differences in contrast. Pixel data taken from the area of the extrudate will show a difference in terms of light and dark (contrast) compared to pixel data taken from the area of the conveyor 20. The number of pixels in any row taken from the area of the extrudate 16 can be counted. Since a digital image is divided into rows and columns of pixels with the numbers of each specific to the digital camera used, the relative width of the image field occupied by the extrudate in any row can be calculated from the count of pixels taken from the area of the extrudate 16. The relative width can be transmitted from the digital imaging device 74 to the real time processor 40 via line 75 where it is used in a manner similar to the relative dimensional measurement calculated from the signals received from the non-contact displacement transducers.

It is understood that the invention is not confined to the particular construction and arrangement of parts herein illustrated and described but embraces such modified forms thereof as come within the scope of the following claims.

I claim:

1. A puller speed control device for controlling dimensions of extrudate comprising:
    a non-contact measuring device configured to detect variations in the dimensions of the extrudate;
    an extrudate puller device;
    a real time processor in communication with the non-contact measuring device and the extrudate puller device, the real time processor configured to respond to the variations in the dimensions of the extrudate by adjusting speed of the extrudate puller device; and
    an interactive touch screen display unit operationally connected to a second processor, wherein the second processor is synchronized with the real time processor to permit operator interaction with the real time processor through the interactive touch screen display unit without interfering with response of the real time processor to the variations in the dimensions of the extrudate,
        wherein the real time processor is configured to receive a measurement signal from the non-contact measuring device and send a command signal to the extrudate puller device without communicating with the interactive touch screen display unit or the second processor in the interim between receiving the measurement signal and sending the command signal.

2. The device of claim 1 wherein the non-contact measuring device comprises at least one pair of optical non-contact displacement transducers.

3. The device of claim 1 wherein the non-contact measuring device comprises a digital camera connected to a digital imaging device capable of frame capture.

4. The device of claim 2 wherein the at least one pair of optical non-contact displacement transducers comprises lasers projecting therefrom to sides of the extrudate as it is extruded from an extruder, wherein the lasers reflect off the sides of the extrudate at an angle of reflection to a receiving element connected to the real time processor, wherein the angle of reflection indicates a distance between the receiving element and the sides of the extrudate.

5. A system for controlling dimensions of extrudate comprising:
   an extruder which extrudes the extrudate;
   a conveyor system for conveying the extrudate;
   a sizing device configured to form a profile of the extrudate;
   a puller device for pulling the extrudate along the conveyor system and through the sizing device; and
   a puller speed control device configured to maintain a desired size of the extrudate, wherein the puller speed control device comprises:
   a non-contact measuring device disposed between the extruder and the sizing device, wherein the non-contact measuring device is configured to detect a change in size of the extrudate;
   a real time processor capable of directing changes in puller speed in response to the change in the size of the extrudate; and
   a touch screen display unit including a programmable microprocessor capable of communication with the real time processor,
   wherein:
   the programmable microprocessor is synchronized with the real time processor to permit operator interaction with the real time processor via the touch screen display unit without interfering with directing changes of puller speed by the real time processor in response to the change in the size of the extrudate, and
   the real time processor is configured to receive a measurement signal from the non-contact measuring device and send a command signal to the puller device without communicating with the touch screen display unit or the programmable microprocessor in the interim between receiving the measurement signal and sending the command signal.

* * * * *